United States Patent [19]

Broszukat

[11] Patent Number: 4,669,742
[45] Date of Patent: Jun. 2, 1987

[54] STUD HOLDER FOR A STUD WELDER

[75] Inventor: Peter Broszukat, Hemer, Fed. Rep. of Germany

[73] Assignee: OBO Bettermann oHG, Menden, Fed. Rep. of Germany

[21] Appl. No.: 723,799

[22] Filed: Apr. 16, 1985

[30] Foreign Application Priority Data

Apr. 17, 1984 [DE] Fed. Rep. of Germany ....... 3414430

[51] Int. Cl.⁴ .............................................. B23K 9/20
[52] U.S. Cl. ................... 279/41 A; 219/98; 279/23 A
[58] Field of Search ............... 279/23 A, 41 A, 46 A, 279/41 R, 46 R, 24, 23 R, 28, 29, 79; 219/98, 75, 137, 43, 42; 29/815; 227/149

[56] References Cited

U.S. PATENT DOCUMENTS

| | | | |
|---|---|---|---|
| 2,405,018 | 7/1946 | Crowley | 279/23 A |
| 2,612,281 | 9/1952 | Erhardt, Jr. | 227/149 |
| 2,874,383 | 2/1959 | Wieneke | 227/149 X |
| 3,309,495 | 3/1967 | Shoup et al. | 219/98 |
| 3,571,893 | 3/1971 | Haviland | 29/815 |
| 3,601,168 | 8/1971 | Fernstrom | 227/149 X |
| 3,774,005 | 11/1973 | Spisak | 219/98 |
| 4,027,136 | 5/1977 | Taylor | 279/41 A X |
| 4,180,195 | 12/1979 | Caley et al. | 227/149 X |
| 4,267,426 | 5/1981 | Mallet | 219/98 |
| 4,284,870 | 8/1981 | Ettinger | 219/98 X |
| 4,436,238 | 3/1984 | Seki | 227/149 |

FOREIGN PATENT DOCUMENTS 2094202 9/1982 United Kingdom ................. 219/98

Primary Examiner—Gil Weidenfeld
Assistant Examiner—Glenn L. Webb
Attorney, Agent, or Firm—Karl F. Ross; Herbert Dubno

[57] ABSTRACT

The stud holder has in the interior of the supply passage of the stud holder proximal to the workpiece side of the clamp jaws, a circular groove for engaging and holding a headlike enlargement of the stud in a plane perpendicular to the axis of the clamp jaws. The supply passage is constricted conically, narrowing in the feed direction of the stud, upstream of the circular groove with respect to feed of studs at least adjacent the clamp jaws. The jaws are expandable against a spring tensioned under influence of the stud as the stud is fed.

8 Claims, 3 Drawing Figures

STUD HOLDER FOR A STUD WELDER

FIELD OF THE INVENTION

My present invention relates to an improved stud holder forming part of a stud welder for welding studs to a workpiece.

BACKGROUND OF THE INVENTION

Known stud holders in prior-art stud welders are constructed to hold a stud, which can have a headlike, rotationally symmetrical enlargement formed on a shaft or shank to be welded to some workpiece. These prior-art stud holders generally comprise a plurality of clamping jaws in which the stud is held, after being fed to the stud holder, so that its shaft end projects out of the stud holder on the workpiece side of the clamping jaws.

Known stud holders and welders include those taught in U.S. Pat. No. 3,309,495. In the stud welder of this patent bolts or studs are supplied for welding to a workpiece one at a time separately by means of a plunger or ramming tool so that the free shaft end of the stud projects through the workpiece-side mouth or end of the clamping jaws. Here the supply passage for the studs is constructed cylindrically for the studs or bolts in the vicinity of the clamping jaws, and has appropriate dimensions so that the studs or bolts are gripped by the clamp jaws exclusively on the periphery.

There is a danger here, particularly with studs or bolts with small head height (thickness), that the studs or bolts, particularly under gravity, will tend to enter or be engaged by the clamp jaws with their free ends slanted downwardly. Thus these incorrectly oriented studs or bolts may be gripped by the clamp jaws and welded in this incorrect orientation.

This danger is even greater when the studs or bolts are supplied by air pressure.

OBJECTS OF THE INVENTION

It is an object of my invention to provide an improved stud holder for a stud welder whereby the aforementioned disadvantages are obviated.

It is a further object of my invention to provide an improved stud holder for a stud welder, in which the possibility that studs are gripped and welded in an incorrect slanted orientation with regard to the proper feed direction is reduced.

It is also an object of this invention to provide an improved stud holder for a stud welder, wherein improper stud orientations for studs gripped in the clamp jaws due to rapid or forceful feed to the stud holder are eliminated.

It is yet another object of the invention to improve by simple means and steps stud holders in stud welders, so that the input stud with the headlike enlargement attains a correct orientation for welding, that is, one in which it is clamped aligned coaxially with an axial extension of the supply passage of the clamp jaws.

SUMMARY OF THE INVENTION

These objects and others which will become apparent hereinafter are attained in accordance with my invention in a stud holder, chuck or collet in and for a stud welder for welding studs to a workpiece, wherein the studs comprise a shaft having formed thereon a rotationally symmetrical headlike enlargement at one end and wherein the studs are fed to the stud holder with the other end forwardly, so that the free end of the shaft of the stud, which is held by the clamp jaws of the stud holder projects toward the workpiece out of the workpiece-side of the clamp jaws.

According to the invention in the interior of the supply passage of the stud holder adjacent the workpiece-side mouth of the clamp jaws, a circular groove for engaging and clamping the headlike enlargement of the stud is provided in a plane perpendicular to the axis of the holder and the stud shaft.

The supply passage is constricted conically, narrowing in the feed direction of the stud, this constriction being upstream of the circular groove with respect to feed of studs at least adjacent the clamp jaws.

Furthermore, the stud holder is constructed expandable against a spring tension under the influence of the stud as it is fed and the jaws have a deflectability enabling entry of the head into the grooves of the jaws.

Thus, any incorrectly oriented feed studs slanted to the long axis of the stud holder will be constrained to assume the correct axial orientation when the headlike stud enlargement first, by a part of its periphery, enters into the circular groove, because then by the continuing stud feed the stud is fixed in the axial direction in the vicinity of the already entered circular groove and accordingly the head is tipped about its aforementioned peripheral region until the remaining part of the head enters the circular groove. Whereafter, by the stipulated orientation of the circular groove with respect to the long axis of the stud holder, the shaft of the stud is constrained to lie coaxial to the longitudinal axis of the stud holder.

Moreover, the stud is now held fixed in the axial direction in the stud holder for welding so that in welding greater contact pressure can be applied by the clamp jaws on the stud.

I have found it to be advantageous to have converging sides or flanks in the circular groove. Thereby, also, manufacturing tolerances in the diameter of the headlike stud enlargement can be continuously compensated for in order to achieve also with more or less large manufacturing tolerances a freed positioning of the clamped stud.

It has proved to be particularly advantageous, to have the workpiece side or flank of the circular groove oriented at an angle substantially 45° to the feed direction of the stud. This enables the clamp jaws to be comparatively easily withdrawn from the welded stud. According to an alternative embodiment of our invention, however, the circular groove has a semicircular vertical cross section in a plane perpendicular to the plane of the circular groove.

According to a further feature of the invention, the conical constriction of the input passage has a cone angle (apex angle) of substantially 30°, in order, with comparatively small effective feed force on the stud, to be able to spread or expand a stud holder having a comparatively high clamping force.

Preferably the clamp jaws comprise a plurality of interchangeable clamping jaws. The conical constriction is provided in the vicinity of the interchangeable clamping jaws, and the circular groove is provided on the inner surfaces of the interchangeable clamp jaws. Thereby the stud holder is comparatively easily and quickly modified for welding of studs of other sizes.

Furthermore, according to my invention, a plurality of clamp shanks expandable against an elastic restoring force jointly form and define the supply passage upstream from the above-mentioned plurality of interchangeable clamping jaws. In the workpiece side of these clamp shanks and, of course, the stud holder, a cylindrical recess of a diameter greater than the diameter of the supply passage is formed. The interchangeable clamping jaws are inserted and held in this recess, and detachably secured therein by, for example, mounting screws, each respectively to one of the clamp shanks.

According to another advantageous feature of my invention the workpiece side of the stud holder is embraced by a circular spring expandable against the elastic restoring force developed in the circular spring. Advantageously the circular spring is installed in a peripheral side radially outwardly open spring groove in the stud holder.

BRIEF DESCRIPTION OF THE DRAWING

The above and other objects, features and advantages of my invention will become more readily apparent from the following description, reference being made to the accompanying drawing in which.

SPECIFIC DESCRIPTION

Figures 1, 2, 3:
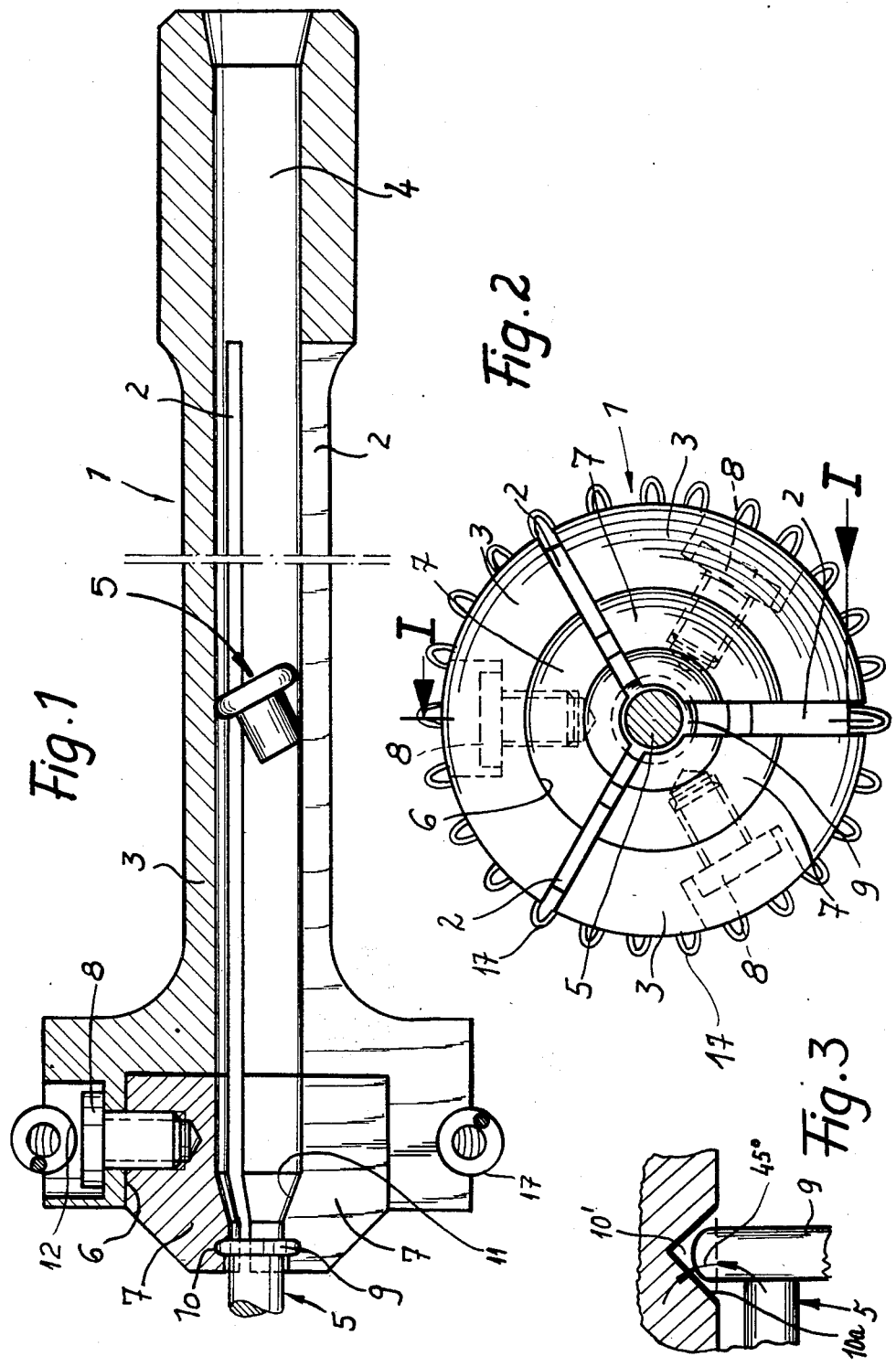
FIG. 1 is a vertical cross sectional view of a preferred embodiment of the stud holder according to my invention taken along the section line I—I of FIG. 2.
FIG. 2 is an end view of the apparatus.
FIG. 3 is an enlarged axial cross sectional view illustrating a modification of FIG. 2.

The tubelike stud holder 1, made out of spring steel, for example, can have three slits 2 running lengthwise, distributed equally about the circumference of the stud holder 1 and only open radially outwardly on the workpiece side.

Accordingly three clamp shanks 3 expandable against their own elastic restoring force are formed by the slits 2, the clamp shanks 3 defining and forming a supply passage 4 for the studs 5.

In the workpiece end portion of the stud holder 1 a cylindrical recess 6 is provided coaxial to supply passage 4, whose diameter is approximately three times as large as the diameter of supply passage 4

In this recess 6 three interchangeable clamping jaws 7 are installed with spacing from each other in the circumferential direction. They are each secured by means of a screw 8 to each one of the clamp shanks 3, whose inner side surfaces form a broken cylindrical interior or inner surface coaxial with supply passage 4. Moreover the spaces between the clamp jaws 7 are aligned exactly in the radial direction with the slits 2.

Each stud 5 has a headlike enlargement 9 and is fed into the stud holders 1 with the shaft 15 pointing forward toward the workpiece (not shown).

In order to be able to clamp the stud 5 by means of the clamp jaws 7 for welding to an unshown workpiece, so that the shaft 15 is held oriented coaxially to the longitudinal axis of the stud holder 1, a circular groove 10 is formed in the interior of the supply passage 4 close to the workpiece side front side of the stud holder 1.

This circular groove 10 lies in a plane perpendicular to the axis of the stud holder 1 and is shaped to receive only the headlike enlargement 9 for clamping the stud 5.

Furthermore the circular groove 10 is arranged with such a clearance from the workpiece-facing end that the free shaft end portion of the clamped stud 5 always projects out of this end of the stud holder 1.

The circular groove 10 has converging sides and can, for example, have a semicircular vertical cross section (FIG. 2) complementary to the shape of the enlargement of the stud 5 so as to fit it.

Preferably, however, at least the converging side of the circular groove 10 in the direction of the workpiece is slanted at an angle of 45° to the feed direction of the studs 5 as shown in FIG. 3.

In the input direction of the stud 5 a conical constriction 11 is provided, which is coaxial to the supply passage 4, whose larger diameter corresponds to the diameter of the supply tube 4, and whose smaller diameter is less than that of the headlike enlargement of the stud 5 to be welded.

The conical constriction 11 operates so that the stud holder 1 can be opened by means of an advancing stud 5 far enough so that the headlike enlargement 9 of the stud 5 can be engaged and clamped in the circular groove 10.

In the periphery of the workpiece end portion of the stud holder 1, I form a circular groove 12 opening radially outwardly and receiving a spring ring 17 for increasing the clamping force.

The above described stud holder 1 is suitable for use in a stud welder in which the studs 5 are fed by means of a ramming or plunger tool or also, for example, by air pressure.

I claim:

1. In a stud holder in a stud welder for welding studs to a workpiece, said studs each having a shaft formed at an end with a rotationally symmetrical outwardly projecting head, and wherein each of said studs is fed to said stud holder with said shaft directed toward said stud holder, so that a free end of a shaft of each stud, when held by clamp jaws of said stud holder, projects toward said workpiece from a workpiece side of said clamp jaws, the improvement wherein:

in the interior of a supply passage of said stud holder proximal to the workpiece side of said clamp jaws, an inwardly open annular groove for engaging and clamping said head is formed in a place perpendicular to an axis of said clamp jaws, said groove having converging sides;

said supply passage is constricted conically, narrowing in a feed direction of said studs; and said jaws are expandable against a spring force by advance of said stud through said passage to lodge said head in said groove and said jaws comprising a plurality of interchangeable clamping members.

2. The improvement according to claim 1 wherein one of said converging sides on a workpiece side of said groove is inclined at a substantially 45° angle to said feed direction.

3. The improvement according to claim 1 wherein said groove has a cross section which is semicircular.

4. The improvement according to claim 1 wherein said supply passage has a conical constriction with an apex angle of substantially 30°.

5. The improvement according to claim 1 wherein said clamp jaws comprise a plurality of interchangeable clamping members, said supply passage being constricted adjacent said plurality of said interchangeable clamping members, and said groove being formed on the inner surface of said plurality of said interchangeable clamping members.

6. The improvement according to claim 5 wherein said stud holder has a plurality of clamp shanks expandable against an elastic restoring force jointly forming and defining said supply passage in said workpiece side of said stud holder and carrying said jaws, a cylindrical recess of a diameter greater than the diameter of said supply passage being formed in said plurality of clamp shanks, said plurality of interchangeable clamping members being fitted into said recess and detachably secured to said clamp shanks.

7. The improvement according to claim 1 wherein said workpiece side of said stud holder is embraced by an annular spring and said stud holder is expandable against an elastic restoring force developed in said annular spring.

8. The improvement according to claim 7 wherein said annular spring is received in a radially outwardly open spring groove formed in said clamp jaws.

* * * * *